United States Patent [19]

Spohr et al.

[11] 3,864,264
[45] Feb. 4, 1975

[54] APPARATUS FOR THE TERTIARY TREATMENT OF LIQUIDS

[75] Inventors: Guenter Spohr, Davidsonville, Md.; Vaughan R. Sparham, Bournemouth, England

[73] Assignee: Hendrick Manufacturing Company, Carbondale, Pa.

[22] Filed: Sept. 6, 1973

[21] Appl. No.: 394,815

[52] U.S. Cl. ................ 210/199, 210/202, 210/260
[51] Int. Cl. .............................................. C02b 3/08
[58] Field of Search ....... 210/19, 20, 108, 199, 201, 210/202, 249, 256, 260, 262

[56] References Cited
UNITED STATES PATENTS

| | | | |
|---|---|---|---|
| 704,244 | 7/1902 | Davis | 210/202 |
| 1,149,045 | 8/1915 | Greth et al. | 210/202 |
| 3,087,620 | 4/1963 | Hirs | 210/401 X |
| 3,307,702 | 3/1967 | Mackrle et al. | 210/20 X |
| 3,487,937 | 1/1970 | Koulovatos | 210/199 X |
| 3,524,810 | 8/1970 | Mackrle et al. | 210/20 |
| 3,595,393 | 7/1971 | Messa et al. | 210/202 X |
| 3,788,981 | 1/1974 | Richard et al. | 210/20 |

FOREIGN PATENTS OR APPLICATIONS
967,760  11/1950  France ................................. 210/20

Primary Examiner—Samih N. Zaharna
Assistant Examiner—Robert H. Spitzer
Attorney, Agent, or Firm—Dybvig & Dybvig

[57] ABSTRACT

A compact apparatus for the tertiary treatment of liquids which combines upward flow clarification through a septum conducive to sludge blanket formation with downflow of the clarified liquid through a treatment medium such as activated carbon followed by contact with a disinfectant such as chlorine. In such apparatus means are provided for locally withdrawing support for the sludge blanket formed above the aforementioned septum thus to collapse the blanket downwardly through the septum without appreciable interference to the progressive movement of liquids through the apparatus.

2 Claims, 3 Drawing Figures

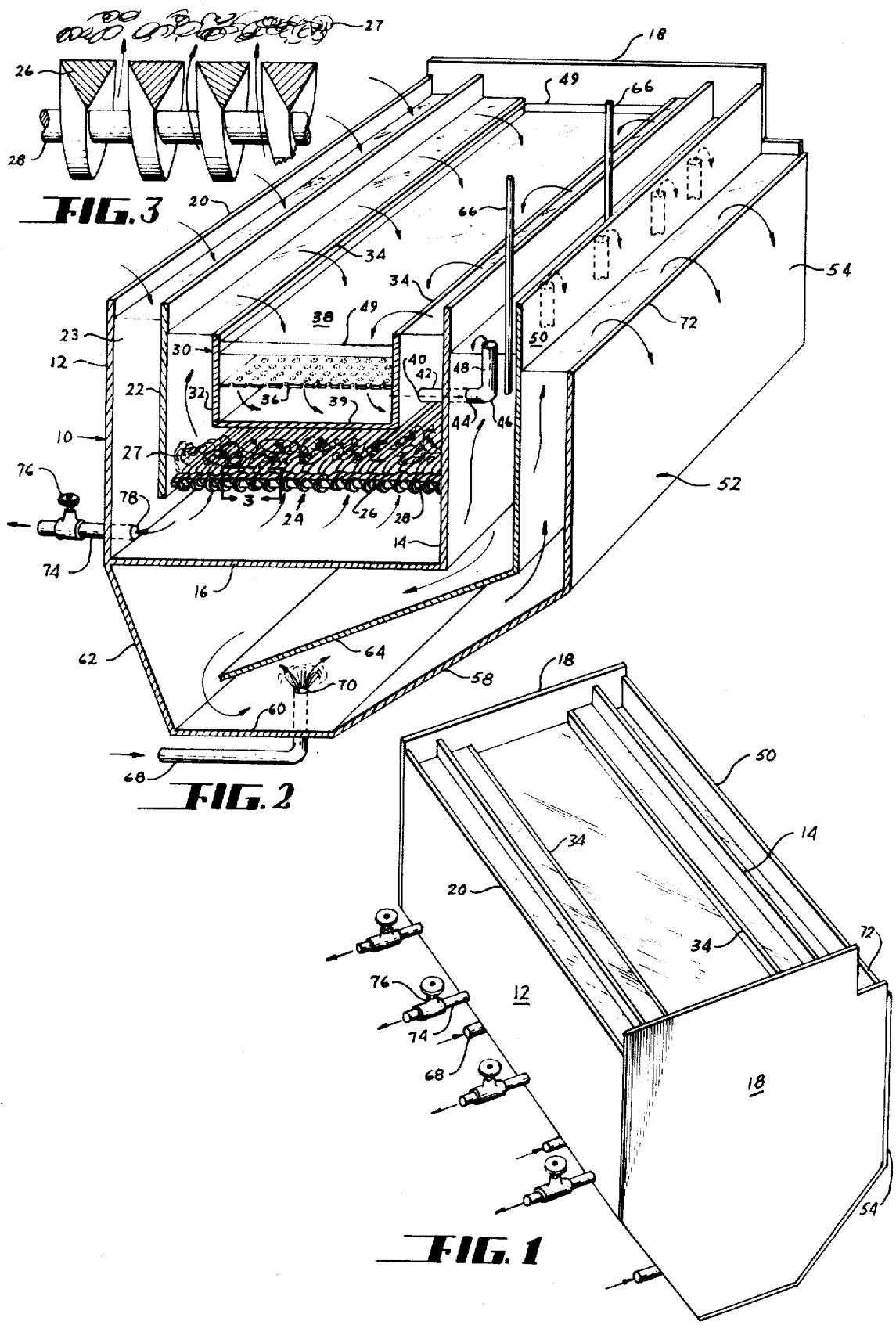

3,864,264

APPARATUS FOR THE TERTIARY TREATMENT OF LIQUIDS

BACKGROUND OF THE INVENTION

Modern texts divide the processes by which sewage is treated into primary, secondary and tertiary treatments. The term "primary treatment" has reference to the removal of coarse matter that may be carried in sewage conduits. Such matter may comprise wood, cloth, sand, stone and the like. The removal is ordinarily accomplished by screening to catch larger components such as pieces of wood and cloth, and also by a controlled flow of the sewage along sloped channels known as grit channels. In the grit channel the speed of fluid flow is such as to retain organic solids but to discharge silt, sand and coarser stones.

In the final stage of this primary treatment, the sewage is discharged into one or more settlement basins in which the velocity of fluid flow is substantially reduced as compared to the flow velocity along the aforementioned grit channels. In the settlement basin a large percentage of the sewage settles toward the floor of the basin. The settled component which is typically called a sludge is periodically scraped or removed from the settlement basin and processed by any of several dewatering or drying techniques. The effluent from the settlement basin, while largely cleansed of settleable sewage components, nevertheless contains a substantial quantity of essentially colloidal matter as well as dissolved impurities. The effluent remains putrefactive and requires further treatment. Such further treatment is called a "secondary treatment."

One mode of secondary treatment involves discharge of the effluent from the primary treatment into a device known as the biological filter. Such devices are not actually filters but are rock-filled structures so maintained as to be favorable to the growth of bacteria capable of digesting impurities in the sewage. The effluent from such filters is a relatively clear water which contains some suspended solids resulting mainly from fragmentation of the bacterial film which grows in the biological filter and includes some dissolved impurities.

Another mode of secondary treatment utilizes an activated sludge process. In the activated sludge process, the settled sewage is blended with bacteria from a suitably maintained culture. An ample aeration and agitation is employed to maintain intimate contact between the bacteria and the sewage, thus promoting a digestion of sewage by the bacterial culture. The effluent from the aeration tank is then discharged to a settling tank in which substantially bacterial sludge accumulates. The effluent from this settling tank is, again, a relatively clear water which contains some colloidally suspended solids and some residual dissolved impurities.

In some sewage systems the effluent from the secondary treatment process is discharged directly into water courses or rivers which substantially dilute the effluent. In many others the effluent is first chlorinated or otherwise chemically disinfected and then diluted in river waters. Chlorination or other chemical treatment for disinfection is not a "tertiary" treatment as that expression is used in the present application because such chemical treatment, without more, does not result in a significant removal of solid and/or dissolved matter.

In recent times, some municipalities have employed a tertiary sewage treatment which involves the further removal of suspended matter which has escaped settlement during the secondary stage of treatment. In some cases the tertiary treatment simply involves retention of the effluent from the secondary treatment in a lagoon, which due to a very low flow velocity, permits a portion of solids remaining after the secondary treatment to settle and also permits a certain amount of biological oxidation. In other cases the settled secondary treatment effluent is strained with a microstrainer effective to remove solid matter. In still some other cases the settled effluent is caused to flow through an upward flow clarifier with or without an added flocculant. The function of the clarifier is to induce the coagulation of solid matter. The coagulated matter remains in the clarifier as a removable sludge blanket while clarified or polished water rising upwardly through the blanket is discharged from the clarifier.

In certain types of municipal sewage plants, particularly those which have contracted to accept industrial wastes, it is desirable to employ adsorption devices such as activated carbon beds. In such plants it is particularly important that colloidal and dissolved impurities be diminished as much as possible before the liquid undergoing treatment is contacted with the activated carbon beds. Thus, if colloidal suspended matter is not first removed, the carbon bed is quickly blinded or occluded, thus defeating its purpose.

The present invention is concerned with a unitary and compact tertiary treatment unit which combines upward flow clarification with a downward flow activated carbon contact.

DESCRIPTION OF THE PRIOR ART

The following patents are representative of prior art in which upflow clarification is combined with a downflow treatment of the clarified liquid: U.S. Pat. Nos. 2,948,400; 3,403,096; 3,433,359; 3,433,360; 3,524,810 and 3,630,377.

SUMMARY OF THE INVENTION

In the present invention a tertiary treatment apparatus comprises a chlorine contact tank into which is compactly assembled an upflow clarifier adapted to receive water to be treated. The clarifier is equipped with a septum in the form of a single sheet or layer or metallic wires which promotes the formation of a flimsy sludge blanket above the septum. The flimsy blanket represents solids, mostly of a colloidal nature, which have escaped the secondary treatment but which, being entrapped in the blanket, are rendered accessible for removal. The apparatus further includes a downflow treatment means assembled in the upflow clarifier and above its septum, the downflow treatment means receiving clarified water, and after downflow treatment of such clarified water, discharging the treated water into the aforesaid chlorine contact tank. Removal of the aforementioned sludge blanket before it reaches the downflow treatment means is accomplished by means of drainage devices associated with the upflow clarifier and operative, without appreciable disturbance to the progressive operation of the entire apparatus, to withdraw the liquid in the above the septum so as to collapse the flimsy blanket downwardly through the septum, thus to remove the blanket contents from the water being treated.

BRIEF DESCRIPTION OF THE DRAWINGS

In the drawings:

FIG. 1 is a perspective view showing exterior features of an apparatus constructed in accordance with the present invention.

FIG. 2 is an enlarged perspective view of the structure illustrated in FIG. 1 with a portion broken away to reveal interior detail.

FIG. 3 is an enlarged elevation view of the structure enclosed by the rectangle 3 of FIG. 2.

DESCRIPTION OF THE PREFERRED EMBODIMENT

As appears in FIGS. 1 and 2, the preferred embodiment comprises a chamber or basin 10 having spaced apart vertically disposed walls 12 and 14 co-operating with a horizontally disposed base 16. The chamber 10 is closed at each end by an end plate 18. Depending upon the size of the construction, the walls 12 and 14 and the base 16 may comprise a single metal plate folded into a U-shape with end plates as shown at 18 welded to the ends of the U-shaped plate.

The upper edge of the wall 12 serves as an inlet or weir 20 over which effluent from a secondary sewage treatment facility, not shown, which is to be served by the subject apparatus is permitted to flow. A barrier plate or baffle 22 extends between and is affixed to the end plates 18 as by welding. The plate 22 is spaced inwardly from the wall 12 to provide a downflow channel or section 23 for the receipt of the effluent from the secondary treatment facility.

The lower edge of the barrier plate 22 is spaced upwardly from the base 16 of the chamber 10 to permit water which has passed over the weir 20 and down the channel 23 to flow across the base 16 and under a foraminous septum 24 horizontally traversing the space between the plate 22 and the wall 14. As shown in FIG. 3, the septum 24 comprises spaced and generally parallel triangular wire elements 26 looped about and supported in a single layer by transverse cross bars 28. The cross bars 28, which are spaced apart along the lengths of the wire elements 26, are welded to or otherwise supported at their ends by the baffle 22 and by the wall 14.

As will be more fully explained in a later portion of this specification, the design and operation of the apparatus is such that a normally continuous head of pressure is maintained by reason of the water disposed between the wall 12 and the plate 22. It will thus be appropriate to refer to the wall 12 and the plate 22 as comprising a standpipe means communicating with a plenum located between the base 16 and the septum 24. The hydraulic pressure associated with this standpipe means assures that for every gallon of water overflowing the weir 20, a gallon of water will upflow through the septum 24.

In the preferred mode of operation, water continuously overflows the weir 20 and accordingly water continuously upflows through the septum 24. Also the apparatus is so sized with respect to the secondary treatment facility being served that the rate of water flow is such that the hourly upflow of water through the septum 24 is approximately 25 gallons per square foot of septum. At this flow rate, much of the particulate matter which escaped the secondary sewage treatment settlement phase is found to accumulate in a blanket 27 closely overlying the septum 24. The formation of the blanket 27 is a particularly advantageous feature of the present invention in as much as the blanket, while not necessarily acting as a filter, is generated as a result of collisions induced between particles passing upwardly through the convergent spaces between the wire elements 26 in the septum 24 with a consequent aggregation of small particles into larger aggregates, which, in turn, coalesce into a blanket.

It is contemplated that the water overflowing the weir 20 will have been relieved of more readily settleable particulate matter during the secondary treatment process. Thus the particles overflowing the weir 20 may be described as colloidal suspended particles. On passage through the triangular wire septum 24, the colloidal suspended particles, as well as the water which suspends the particles, are locally accelerated due to the convergent walls of the triangular wire elements 26. Then, immediately after passage through the septum the particles are decelerated by quiescent water overlying the septum. This agitation of the water by acceleration through the septum and a deceleration above the septum is believed to promote the aggregation of particles immediately above the septum. Upon such aggregation, some of the colloidal particles cling together as aggregates which are too dense to remain suspended. Nevertheless, the aggregates are prevented from settling due to the upflow of water through and above the septum 24. However, due to their increased density, the aggregates lose their upward momentum and reside as a flimsy fluidized blanket 27 above the septum 24. The upflowing water, still containing a minor portion of suspended solids which have escaped the blanket 27, flows upwardly between the plate 22 and the wall 14 and around the side walls 32 of a channel or tray member 30. The channel member is supported above the septum 24 by welding to the end plates 18.

The upper edges of the walls 32 provide weirs 34 for the overflow of water flowing upwardly from the septum 24 into the channel member 30. The weirs 34 collectively comprise an outlet weir for the clarified water. Fixedly mounted within the channel member 30, as by welding to the side walls 32, is a perforate supporting plate 36 which supports an overlying bed 38 comprising a treatment medium such as activated carbon. Water overflowing the weirs 34 percolates downwardly through the activated carbon and through the perforate plate 36 to accumulate above the bottom 39 of the channel member 30. The water accumulating above the bottom 39 is permitted to escape the channel member 30 through outlet openings 40 into outlet pipes 42.

The outlet pipes 42 are welded or otherwise sealed to the chananel member 30 and pass through openings 44 in the wall 14 to which the pipes 42 are welded so as to by-pass the upflow clarifier and preclude a return of the water escaping the channel member 30 to the clarifier. Outside the wall 14, the pipes 42 have upturned elbows 46 supporting upright sections 48. The elevation to which the upright sections 48 extend is lower than that of the weirs 34 and accordingly the hydraulic head established by the water overflowing the weirs 34 is sufficient to drive the water which percolates through the treatment bed 38 upwardly and out of the upright sections 48. The lines 49 appearing in FIG. 2 indicate the approximate water level maintained in the channel member 30 by reason of the upright sections 48.

The water escaping the upright sections 48 is permitted to flow downwardly between the outside wall 14 of the chamber 10 and a partition wall 50 spaced outwardly from the upright sections 48. The downward descent of this water from the sections 48 is deflected and contained by reason of a tank 52 into which the chamber 10 has been assembled. The tank 52 is formed by a one-piece plate member which has been bent so as to have a vertical outer wall 54, a sloping intermediate wall 58, a base 60 and a second sloping wall 62 which is welded or otherwise affixed to the wall 12 of the chamber 10. The aforementioned partition wall 50 has also been bent to form a wall portion 64 which slopes downwardly over a major portion of the base 60 for the tank 52 and under a major portion of the base 16 for the chamber 10.

The upper edge of the vertically extending wall 54 provides an outlet weir 72 for the tank 52 and it will be noted that this outlet weir has an elevation which is lower, but not appreciably lower, than the elevation to which the upright sections 48 extend. As a consequence the tank 52 accumulates a substantial amount of water under and about the chamber 10 and, during normal operation, the amount of water overflowing the weir 72 will equal the amount of water escaping the upright sections 48.

It will thus be understood that during the normal operation of the subject treatment apparatus, there will be a rather slow downward drift of water escaping the upright section 48 to one side of the partition wall 50 followed by a relatively slow upward drift of such water on the opposite side of the partition wall 50. A suitable number of pipes 66 having their ends immersed in the downwardly flowing water adjacent the upright sections 48 contact such water with a disinfectant such as chlorine.

A thorough mixture of the disinfectant is promoted by a plurality of pipes 68 receiving air or oxygen from a suitably pressurized source, not shown. The pipes 68 are welded to and project upwardly through aperture 70 in the base 60 of the tank 52. The pressure of the air in the pipes 68 is sufficient in relation to the hydraulic head established by the outlet weir 72 that the air or oxygen will continuously bubble into the water upflowing adjacent the partition wall 50 thus to aerate the disinfectant and water mixture.

It will be apparent to those skilled in the art that with continuous operation of the treatment apparatus disclosed, and, without appropriate corrective procedures, the initially flimsy blanket 27 which forms above the septum 24 will grow indefinitely large and in time could become a relatively impenetrable and hence unstable sludge blanket. To prevent such an occurence, means are provided for periodically collapsing and removing the blanket 27. For this purpose, the apparatus includes a plurality of drainage pipes 74 regulated by drainage valves 76. Each of the drainage pipes 74 is welded or otherwise affixed to an aperture 78 in the wall 12 of the chamber 10.

In one practice, the inflow of water from the secondary treatment facility (not shown) is interrupted. After such interruption the water treatment process will continue only until such time as the head of water maintained between the wall 12 and the baffle 22 descends to the level of the orifices of the upturned pipe sections 48. At this time the blanket 27 will remain temporarily above the septum 24 and below the base of the channel member 30, the blanket being supported, in effect, by now static water underlying the same.

What has been described above is a static condition which, in practice, is not actually reached. As soon as the inflow of water from the secondary treatment facility is interrupted, or even before, the valves 76 are opened to permit the water supporting the blanket 27 to drain outwardly through the pipes 74 to a suitable return path (not shown) to the secondary treatment facility. As this outward drainage occurs, the blanket 27 drops downwardly through the septum 24 by reason of the weight of the water overlying the blanket. This downflow of first the blanket and then the overlying water through the septum 24 not only drops the blanket but also washes the septum, the result being that the blanket is washed out of the chamber 10 through the pipes 74.

Recognizing, of course, that this collapse of the blanket 27 will not necessarily completely cleanse the chamber 10, although complete cleansing would not be necessary on all occasions, attendants can utilize this opportunity to clean the interior of the chamber 10 with suitable hoses, washing any debris through the outlet apertures 78.

Upon closure of the valves 76 and resumption of an inflow from a secondary treatment facility, the operation of the treatment apparatus can be resumed and fairly promptly thereafter a new blanket 27 will appear above the septum 24.

What has been described above is a complete collapse and removal of the blanket 27. A complete removal of the blanket is not always necessary. Due to aggregation, as previously described, the material captured in the blanket is a settleable material which has not hitherto settled because of the normally continuous upflow of water through the septum 24. Those skilled in the art will understand that the receipt of water from the secondary treatment facility will vary throughout any given day and the apparatus herein disclosed will be designed to accept the average output of water from the secondary treatment facility. This means that there will be periods when the receipt of water from the secondary treatment facility will be low and it will be possible to drop the blanket 27 by opening the valves 76 without interrupting the inflow of water from the secondary treatment facility. At such times, the blanket 27 is permitted to settle downwardly through the septum 24 where it can rest on the base 16. Since the blanket is relatively flimsy, this collapse of the blanket without its total removal from the apparatus can be repeated several times before an accumulation of sludge on the base 16 necessitates a complete collapse and sludge withdrawal as above indicated.

It is to be noted, of course, that by suitably sizing the pipes 74, the mere collapse of the blanket 27 through the septum need not await times when the effluent from the secondary treatment facility is low.

In describing the operation of the present apparatus, it has been stated that the blanket 27 will form above the septum 24 and below the channel member 30. The blanket is formed above the septum 24 because the conditions which promote blanket formation do not exist until the water being treated has flowed upwardly through the septum 24. However, the elevation above the septum 24 at which the blanket will appear depends on a number of factors many of which cannot be ascertained except by experimentation. A minimum rate of flow such as 5 gallons per square foot per hour is required before a blanket can form. However, the elevation above the septum at which the blanket will rest in fluidized suspension depends upon the nature and flow rate of the secondary effluent and this, in turn, depends upon a combination of variable factors such as weather conditions, i.e. the contribution of storm waters to the sewage waters being processed, industrial processes occurring in the community being served; season variations and the like. In general, the blanket will form only an inch or less above the septum 24 and it will be sufficient to locate the base of the channel member 30 between 1 and 2 feet above the septum 24, thus to be assured that the presence of the channel member 30 will not interfere with an orderly blanket formation.

In the preferred construction the triangular wire elements 26 which comprise the septum 24 are equilateral except where looped about the cross bars 28, with each side being approximately 3 millimeters in width and the gap or spacing between the confronting apices of adjacent wires being in the range of 0.125 to 1.25 millimeters. Those skilled in the art will recognize that triangular wire septa such as shown and described represent only a preferred structure for inducing blanket formation in an upward flow clarifier. Alternatives are pebble beds, perforate plates, woven screens and the like having openings or foramina with gap dimensions comparable to those recited above.

Although the presently preferred embodiment of this invention has been described, it will be understood that various changes may be made within the scope of the appended claims.

Having thus described our invention, we claim:

1. Unitary apparatus for the treatment of water comprising: a tank in which water to be treated is contacted with a disinfectant, an upflow clarifier mounted within said tank, said clarifier traversed by a foraminous septum, means disposed within said tank and above the base of said tank forming a plenum below and in communication with said septum, said clarifier having wall means surrounding said septum and forming a chamber thereabove, tray means supported by said wall means within said chamber, said tray means having a bottom spaced above said septum and having a wall portion projecting upwardly from said bottom to provide a weir over which water disposed in said chamber may flow to enter said tray means, perforate means spaced above said bottom supporting a downflow treatment medium in said tray means whereby water overflowing said weir may trickle downwardly through said medium and through said perforate means into the space under said perforate means, outlet means communicating from said space through said wall means to discharge water from said tray means to said tank, said tank having a partition wall spaced from said wall means, water from said tray means discharged through said outlet means to the space between said partition wall and said wall means, said partition wall extending between opposite sides of said tank, said partition wall spaced above the base of said tank, said tank having an outlet weir, said partition wall spaced from said outlet weir, water received from said tray means flowing downwardly in said tank to one side of said partition wall, and then through the space between said partition wall and the base of said tank and upwardly in said tank to said outlet weir on the other side of said partition wall, said apparatus further including means to admit a disinfectant to said water discharged from said tray means, standpipe means to receive water to be treated, said standpipe means having communication with said plenum and maintaining a hydraulic head effective to advance said water upwardly through said septum and over said weir for percolation through said treatment medium and descent through said outlet means to said tank, drainage means to drain water from said tank and having communication with said plenum and said standpipe means below the level of said septum, said including valve means operatively connected to and normally closing said drainage means for selectively opening said drainage means to withdraw water disposed below said septum thus to induce a downflow of water through said septum.

2. The apparatus of claim 1 including means communicating through the bottom of said tank to the space between said partition wall and the bottom of said tank to introduce a gas effective to agitate said water passing upwardly to said weir.

* * * * *

UNITED STATES PATENT OFFICE
CERTIFICATE OF CORRECTION

Patent No. 3,864,264　　　　　　　　Dated February 4, 1975

Inventor(s) Guenter Spohr, et al.

It is certified that error appears in the above-identified patent and that said Letters Patent are hereby corrected as shown below:

Column 2, line 61, "the" (second occurrence) should read ---and---.

Column 4, line 38, "clarilfied" should read ---clarified---.

Column 4, line 50, "chananel" should read ---channel---.

Column 8, line 31, "said" (second occurrence) should read ---and---.

Signed and sealed this 27th day of May 1975.

(SEAL)
Attest:

RUTH C. MASON
Attesting Officer

C. MARSHALL DANN
Commissioner of Patents
and Trademarks